(12) United States Patent
Brassell

(10) Patent No.: US 6,763,802 B1
(45) Date of Patent: Jul. 20, 2004

(54) INTAKE MANIFOLD VALVE SYSTEM

(75) Inventor: David Brassell, Walled Lake, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 10/303,453

(22) Filed: Nov. 25, 2002

(51) Int. Cl.$^7$ .............................. F02D 9/08; F02M 35/10
(52) U.S. Cl. ................... 123/336; 251/305; 123/184.61
(58) Field of Search ............................ 123/336, 184.21, 123/184.38, 184.53, 184.61; 251/305; 29/890.12, 888.01

(56) References Cited

U.S. PATENT DOCUMENTS

| | | | |
|---|---|---|---|
| 3,724,812 A | 4/1973 | Richardson | 251/306 |
| 3,753,549 A | 8/1973 | Rubright | 251/305 |
| 4,200,258 A | 4/1980 | Gliatas | 251/214 |
| 4,907,547 A | 3/1990 | Daly | 123/184.53 |
| 4,972,814 A | 11/1990 | Matsuki et al. | 123/308 |
| 5,105,774 A | 4/1992 | Piccini | 123/184.55 |
| 5,671,712 A * | 9/1997 | Uchida | 123/308 |
| 5,813,380 A * | 9/1998 | Takahashi et al. | 123/184.55 |
| 5,875,758 A * | 3/1999 | Fujita | 123/336 |
| 2003/0136936 A1 * | 7/2003 | Krause | 251/305 |

FOREIGN PATENT DOCUMENTS

JP  152862  * 6/2001  ........... F02B/31/00

* cited by examiner

Primary Examiner—Hai Huynh
(74) Attorney, Agent, or Firm—MacMillan, Sobanski & Todd, LLC

(57) ABSTRACT

An improved intake manifold valve system for use in a vehicle engine and method of assembly therein. The intake manifold valve system includes a valve housing defining an axis. The valve housing includes a first end and an opposite second end. The first end has an opening formed therein. The opening defines a first axial length. The intake manifold valve system includes a valve shaft assembly disposed in the valve housing. The valve shaft assembly includes a shaft having at least one valve provided thereon. The shaft includes a first end and an opposite second end. The second end has with an extended portion. The extended portion defines a second axial length that is greater than the first axial length of the opening. When the extended portion of the shaft is positioned in the opening, the extended portion is movable axially within the opening. At the same time, the extended portion is operative to operatively support the shaft relative to the valve housing.

14 Claims, 3 Drawing Sheets

INTAKE MANIFOLD VALVE SYSTEM

BACKGROUND OF THE INVENTION

This invention relates in general to vehicle engines and in particular to an improved intake manifold valve system for use in such a vehicle engine and method for assembly.

A multi-cylinder internal combustion engine requires a reliable and regulated source of air. An intake manifold assembly generally supplies the source of air. The intake manifold assembly of a multi-cylinder engine includes a plurality of branched air passageways, or conduits. Each of the air passageways defines a generally tubular runner having an air intake port and an opposite air inlet port. The air intake port of the runner is joined to an associated plenum which supplies atmospheric, turbo, or supercharged air to the runner intake port, and the air inlet port is joined to a flange which is joined to an associated inlet port of each cylinder head of the engine to supply the air from the runner to each cylinder head. Conventional intake manifold assemblies are constructed of cast iron, magnesium, aluminum, and plastic.

In some cases an automotive air intake manifold includes a valve system to regulate the amount of airflow to the internal combustion engine or provide a certain motion control of the intake charge. A conventional valve system includes a plurality of valves, which are commonly referred to as butterfly valves, which are attached to a shaft that runs the length of the manifold. The assembly process for this type of valve system requires that the shaft be threaded through the manifold through a hole that has been machined or molded into a manifold seal housing. Opposing ends of the shaft are then secured. After the shaft has been threaded through the hole, the butterfly valves are mechanically attached to the shaft.

SUMMARY OF THE INVENTION

This invention relates to an improved intake manifold valve system for use in a vehicle engine and method of assembly therein. The intake manifold valve system includes a valve housing defining an axis. The valve housing includes a first end and an opposite second end. The first end has an opening formed therein. The opening defines a first axial length. The intake manifold valve system includes a valve shaft assembly disposed in the valve housing. The valve shaft assembly includes a shaft having at least one valve provided thereon. The shaft includes a first end and an opposite second end. The second end has with an extended portion. The extended portion defines a second axial length that is greater than the first axial length of the opening. When the extended portion of the shaft is positioned in the opening, the extended portion is movable axially within the opening. At the same time, the extended portion is operative to operatively support said shaft relative to said valve housing.

Other advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
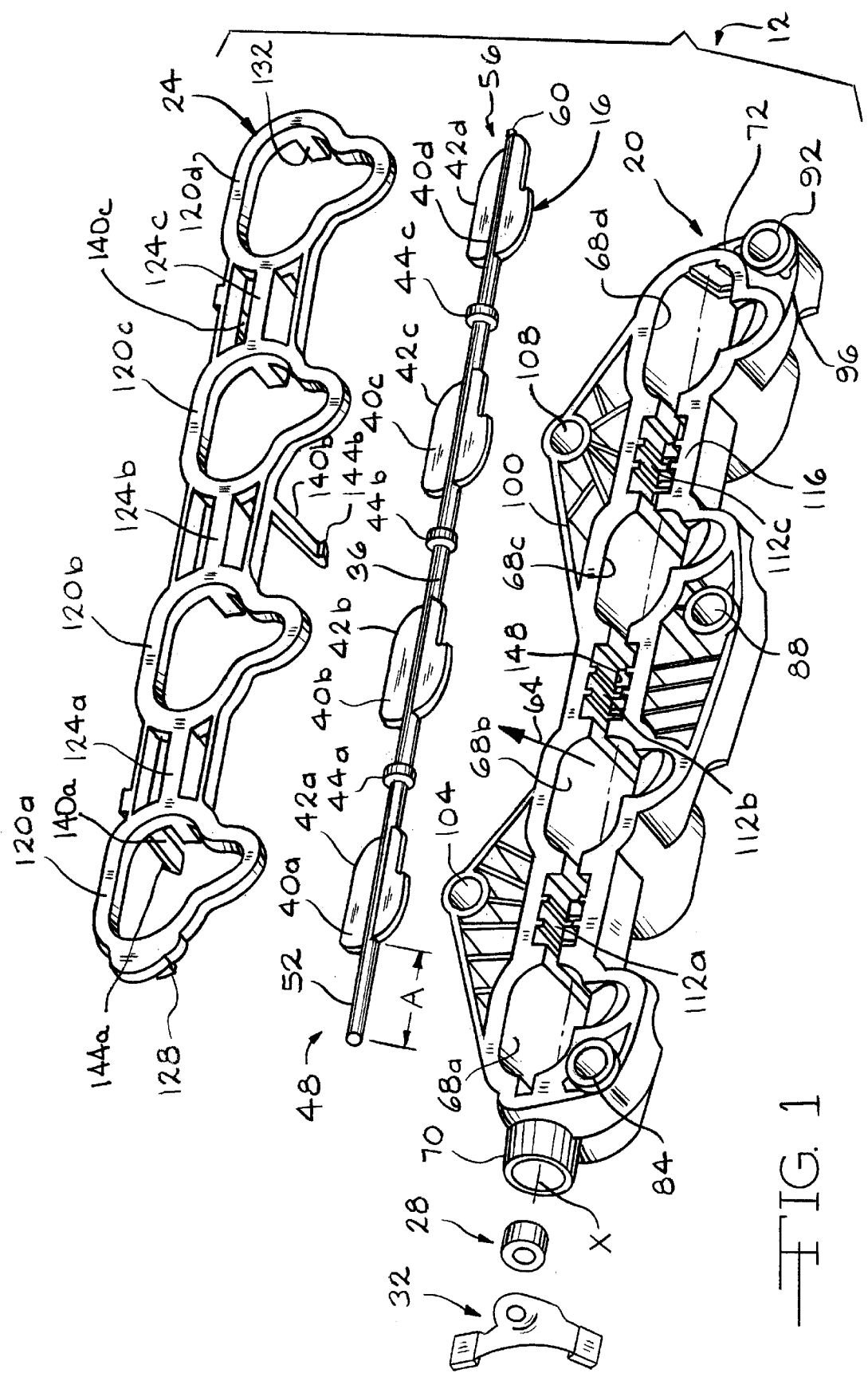
FIG. 1 is a perspective view of an intake manifold valve system according to the present invention.
Figure 2:
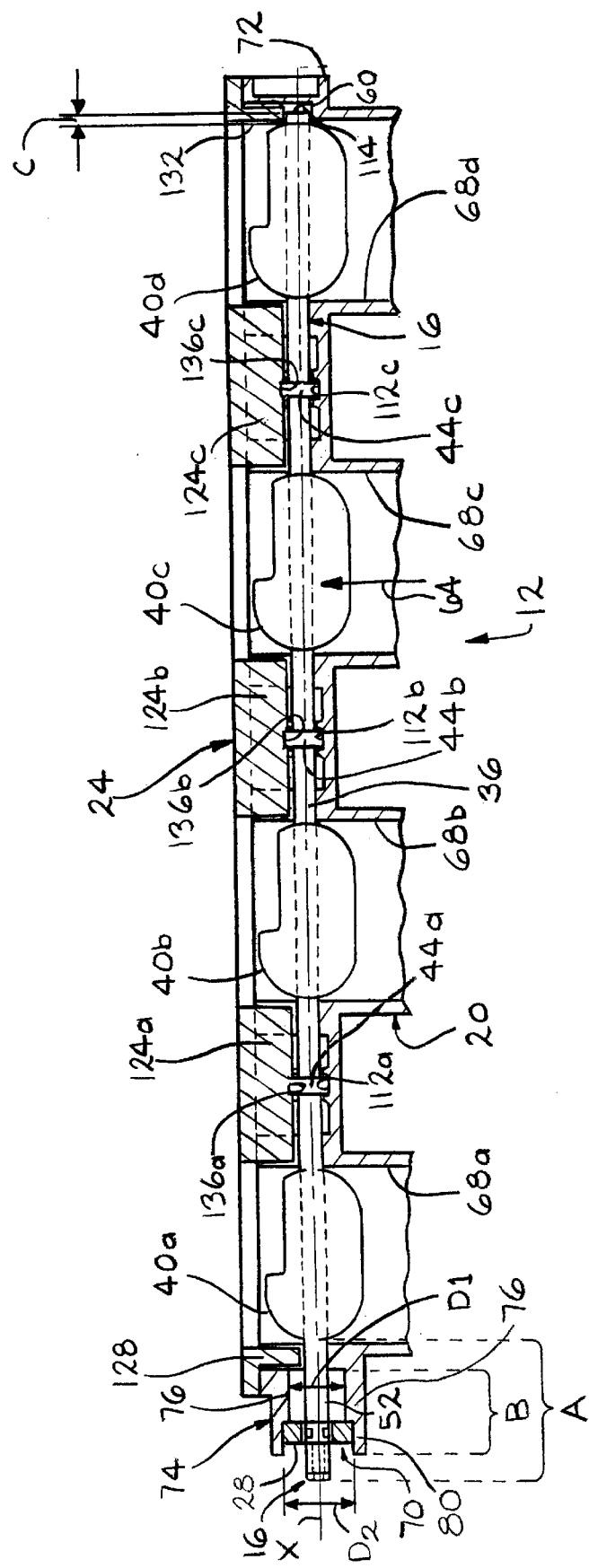
FIG. 2 is a cross-section elevational view of the intake manifold valve system of FIG. 1.
Figure 3:
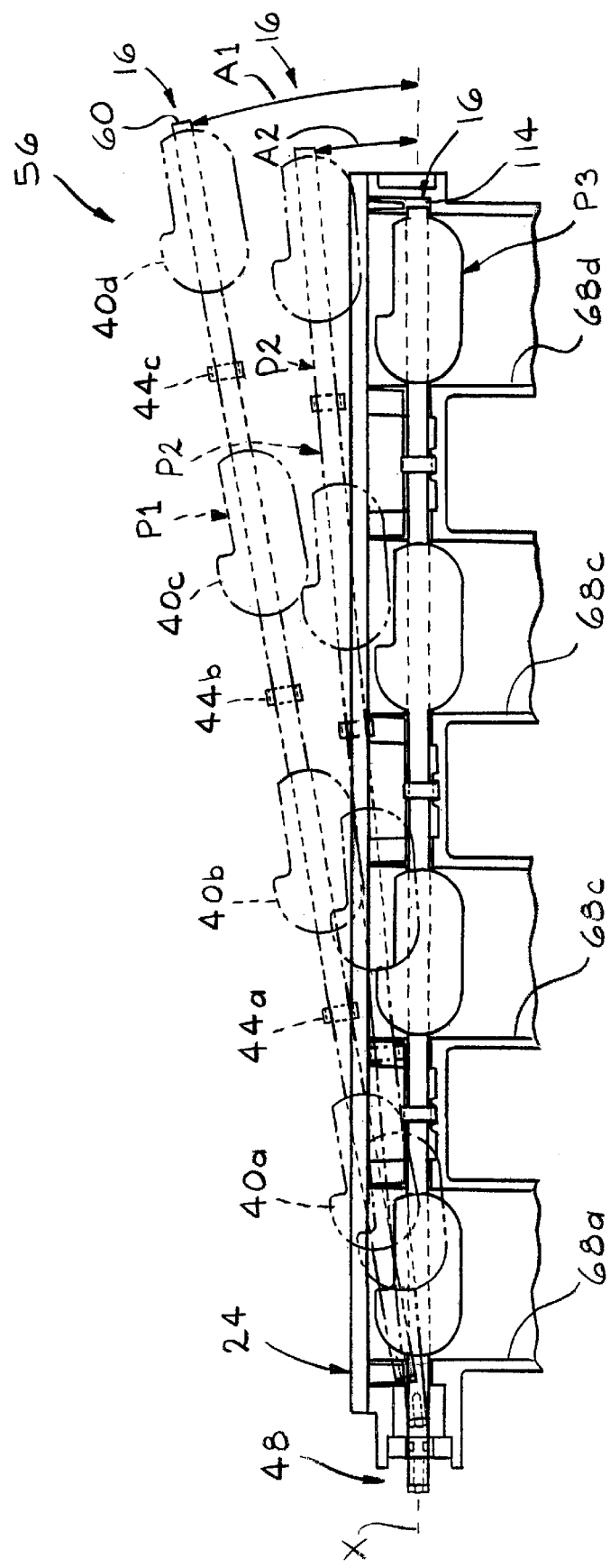
FIG. 3 is a cross-section elevational view showing the process of assembly of the intake manifold valve system of the present invention.

Referring now to FIGS. 1–3, there is illustrated an intake manifold valve system, indicated generally at 12, according to the present invention. For purposes of clarity, only those portions of the intake manifold valve system 12 necessary for the understanding and description of the invention will be discussed herein. As shown therein, the intake manifold valve system 12 includes a valve shaft assembly 16, a valve housing 20, a gasket assembly 24, a carrier gasket 28, and a bearing nut 32.

The valve shaft assembly 16 of the intake manifold valve system 12 is positioned approximately along a longitudinal axis X of the valve housing 20, as shown in FIGS. 1 and 2. The valve shaft assembly 16 is operative to selectively regulate the flow of a gas, such as for example air, through the valve housing 20. It will be appreciated that the gas selectively flows through the intake manifold valve system 12 in the direction indicated by the arrow 64 (shown in FIGS. 1 and 2), as will be appreciated.

The illustrated valve shaft assembly 16 includes a shaft 36 which supports four valves 40a, 40b, 40c, and 40d and three vibration dampeners 44a, 44b, 44c. The vibration dampeners 44a, 44b and 44c are provided to reduce the overall system noise and are made of a rubber compound with possibly a metal sleeve to support the shaft assembly. Preferably, a slight clearance is provided between the vibration dampeners and the shaft to allow for ease of shaft rotation while not allowing air to pass between adjacent runner tracks. The vibration dampeners 44a, 44b and 44c are typically assembled prior to the valves. The valves 40a–40d can be formed integral with the shaft 36 during a suitable forming process or can be formed separate from the shaft and mechanically attached thereto by suitable means.

The shaft 36 includes a first end 48 and an opposite second end 56. The first end 48 is operative to provide support for the shaft 36, a press fit bearing 28 for ease of rotation, and a lever 32 to actuate the shaft 36. The first end 48 includes a first extended end portion 52, which extends a first predetermined axial distance A shown in FIGS. 1 and 2. The second end 56 includes a second extended end portion 60, which extends a second predetermined axial distance C shown in FIG. 2. In the illustrated embodiment, the distance A is greater than the distance C. The second extended end portion 60 can be supported in the valve housing 20 and its length adjusted as required. The shaft 36 may be formed from a plastic material or any other suitable material. Non limiting examples of a suitable plastic material is nylon 66 (polyhexamethylene adipamide) or nylon 6 (polycaproamide). Other multipurpose plastics may also be employed. The illustrated shaft 36 has a generally annular cross-sectional shape and is preferably a rigid shaft formed from a suitable metal material. Alternatively, the material and/or-structure of the shaft 36 can be other than illustrated if so desired. Also, the shaft 36 may be a flexible structure that is able to flex during assembly. The term "rigid" in understood to include a structure able to resist deformation so as to retain an existing general shape and size. The term "flexible" in understood to include a structure having the property of flexibility, able to be repeatedly bent and still maintain its original shape afterward.

The valves 40a–40d are preferably formed from a suitable plastic material or the like. Non limiting examples of a suitable plastic material is nylon 66 (polyhexamethylene adipamide) or nylon 6 (polycaproamide). Other multipurpose plastics may also be employed. Also, the valves 40a–40d are preferably formed integral with the shaft 36 during a molding process. Alternatively, the valves 40a–40d can be formed from other suitable materials, such as for example metal, and/or the valves 40a–40d can be formed separate from the shaft 36 and secured thereto by suitable means, such as for example, by welding or using fasteners. The valve shaft assembly 16 may include any suitable number of valves 40a–40d. The number of the valves 40a–40d is preferably equal to the number of cylinders (not shown) provided in the engine (not shown). As will be discussed below, the valves 40a–40d are selectively movable relative to the valve housing 20 to regulate the flow of the gas therethrough. It will be appreciated that each of the vibration dampeners 44a, 44b, 44c are positioned on the shaft 36 between an associated pair of fins 40a–40d in a predetermined position relative thereto.

Each of the valves 40a–40d include a respective outer peripheral edge 42a–42d that defines an associated outer or perimeter rim seal. The perimeter rim seals 42a–42d are preferably made of a resilient material, such as for example rubber or the like. The perimeter rim seal 42a–42d are preferably attached to the respective fins 40a–40d by a molding process. Alternatively, the perimeter rim seals 42a–42d can be attached to the fins 40a–40d by other suitable means if so desired. The illustrated separators 44a–44c are formed from a suitable rubber or plastic material or the like. Non limiting examples of a suitable plastic material is nylon 66 (polyhexamethylene adipamide) or nylon 6 (polycaproamide). Other multipurpose plastics may also be employed.

The valve housing 20 of the intake manifold valve system 12 is preferably a lower manifold and is in fluid communication with the cylinders of the vehicle engine. The illustrated valve housing 20 is formed from a suitable plastic material or the like. Non limiting examples of a suitable plastic material is nylon 66 (polyhexamethylene adipamide) or nylon 6 (polycaproamide). Other multipurpose plastics may also be employed. Also, the valve housing 20 can be aluminum die cast. The illustrated valve housing 20 includes four passageways 68a, 68b, 68c, and 68d, though any suitable number of passageways may be provided. The passageways 68a–68d are positioned to cooperate with the fins 40a–40d of the valve shaft assembly 16, as will be discussed below.

The valve housing 20 includes a first opened end 70 and a second opposite closed end 72. The first end 70 preferably includes an annular hollow collar and includes a stepped body 74. The body 74 includes a first inner portion 76 and a second outer portion 80. The first inner portion 76 is a shaft insertion port. The first inner portion 76 of the body 74 defines a first inner diameter D1, and the second outer portion 80 of the body 74 defines a second inner diameter D2 that is greater than the first inner diameter D1. It will be appreciated that the illustrated first inner portion 76 and the illustrated second outer portion 80 are recesses in the body 74.

The valve housing 20 also includes a plurality of mountings to allow the valve housing 20 to be secured in the engine. In particular, the illustrated valve housing 20 includes a first mounting 84, a second mounting 88, and a third mounting 92 each along a first outer peripheral edge 96 of the valve housing 20. The valve housing further includes a fourth mounting 104 and a fifth mounting 108 along a second outer peripheral edge 100 thereof. Alternatively, the number and/or location of the mountings may be other than illustrated if so desired.

In the illustrated embodiment, the valve housing 20 further includes separator notches 112a, 112b, and 112c. The separator notches 112a, 112b, and 112c are adapted to operatively support the vibration dampeners 44a, 44b, and 44c, respectively. The illustrated separator notches 112a–112c are positioned generally intermediate between each pair of the passageways 68a–68d. The separator notches 112a–112c preferably cooperate with the vibration dampeners 44a–44c to limit vibration of the shaft 36. In a preferred embodiment, the separator notches 112a–112c receive the vibration dampeners 44a–44c and act in concert with lugs 124a, 124b and 124c of gasket assembly 24 and notches 112a, 112b and 112c in the valve housing 20 so as to form a fluid-tight seal between runner tracts.

The closed second end 72 of the valve housing 20 includes a recess 114 provided therein, shown in FIG. 4. The recess 114 is adapted to receive and operatively support the second end 56 of the valve shaft assembly 16. The illustrated recess 114 defines a shoulder. The valve housing 20 also includes a generally flat upper surface 116, which is operative to support the gasket assembly 24, as further described herein.

The gasket assembly 24 is commonly referred to as a carrier gasket and typically consists of a plastic carrier with integrally molded silicon rubber seats. The gasket assembly 24 of the intake manifold valve system 12 is operative to selectively limit the movement of the valve shaft assembly 16 within the valve housing 20. In the preferred embodiment, the gasket assembly 24 is provided between the cylinder head (not shown) of the engine and the valve housing 20. The illustrated gasket assembly 24 is formed from a resilient material and includes seals 120a, 120b, 120c, and 120d. Non limiting example of suitable resilient materials for the illustrated gasket assembly 24 include silicon rubber, elastic plastics, and the like. While the illustrated gasket assembly 24 includes four seals 120a–120d, any suitable number of seals may be provided. However, the number of seals 120a–120d preferably corresponds to the number of passageways 68a–68d. The illustrated seals 120a–120d are generally oval-shaped and are supported by the upper surface 116 of the valve housing 20.

In the preferred embodiment, the lugs 124a, 124b and 124c act as a seal between the runners as mentioned above; retain the shaft assembly 16 in the valve housing 20 via legs 144a–44c; and via lugs 124a–124c and also lugs 128 and 132 make a small portion of the runner track that is removed in the manufacture of the valve housing 20. Any suitable number and shape lugs 124a–124c, 128 and 132 may be employed. The lugs 124a–124c are operative to selectively limit movement of the shaft 36 of the valve shaft assembly 16. The lugs 124a–124c are preferably spaced apart from the shaft 36. Alternatively, the structure, location, and/or the number of one or more of the lugs 124a–124c and 128 and 132 can be other than illustrated if so desired.

In the illustrated embodiment, the lugs 124a, 124b, and 124c include slots 136a, 136b, and 136c, respectively. The illustrated slots 136a, 136b, and 136c are positioned approximately in the center portion of the separator lugs 124a, 124b, and 124c, respectively. The slots 136a, 136b, and 136c are preferably proximate to and spaced apart from the vibration dampeners 44a–44c, respectively. When the valve shaft assembly 16, the valve housing 20, and gasket assembly 24 are assembled, the lugs 124a–124c, 128 and 132 of the gasket assembly 24, the vibration dampeners 44a–44c, and the valve housing 20 cooperate and interact to provide the runner to runner sealing mentioned above.

The gasket assembly 24 further includes extensions or legs 140a–140c. FIG. 1 shows the legs 140a–140c extending from a lower surface of the gasket assembly 24. In the illustrated embodiment, each of the legs 140a–140c is formed integral with the gasket assembly 24 and includes an associated foot 144a–144c (only feet 144a and 144b shown in FIG. 1). The legs 140a–140c are operative to position the feet 144a–144c adjacent a lower surface 148 of the valve housing 20. Each of the feet 144a–144c is preferably an upturned or hook shaped member, although it may be any suitable shape. It will be appreciated that the legs 140a–140c are positioned to engage the valve housing 20, thereby coupling the valve housing 20 and the gasket assembly 24. During assembly, the legs 140a–140c are preferably deformed or deflected as the gasket assembly 24 is coupled with the valve housing 20. In the final installed position, each of the feet 144a–144c is operative to attach the gasket assembly 24 to the valve housing 20. The feet 144a–144c may secure the gasket assembly 24 to the valve housing 20 along any suitable location along the lower surface 148 thereof. Alternatively, the number, the structure, and/or the location of the feet 144a–144c can be other than illustrated if so desired. Alternatively, in addition to the feet 144a–144c or in place thereof, the gasket assembly 24 may be secured to the valve housing 20 by other suitable mechanical or chemical means.

Turning now to FIG. 3, the assembly of the components of the valve system 12 of the present invention will be discussed. FIG. 3 illustrates three positions of the valve shaft assembly 16 with respect to the valve housing 20. The three positions are indicated generally as P1, P2 and P3. The position P1 is the initial position of the valve shaft assembly 16, shown in phantom. The position P2 is the intermediate position of the valve shaft assembly 16, shown in phantom. And the position P3 is the installed position of the valve shaft assembly 16.

In the first position P1, the first end 48 of the valve shaft assembly 16 is positioned in the first opened end 70 of the valve housing 20 such that the shaft 36 is positioned at an acute angle A1 with respect to the longitudinal axis X of the valve housing 20. Next, the first end 48 of the valve shaft assembly 16 is further advanced into the opened end 70 to enable the second end to be moved downwardly in FIG. 3 such that the shaft 36 is in the position P2. In the position P2, the shaft 36 is positioned at an acute angle A2 with respect to the longitudinal axis X of the valve housing 20. Following this, the first end inserted end 48 is still further advanced into the opened end 70 of the valve housing 20 such that the shaft 36 is positioned approximately coaxial with the longitudinal axis X. Then, the shaft 36 is slightly moved to the right in FIG. 3 whereby the end portion 60 of the second end 56 of the shaft 36 is supported on the shoulder 114 of the valve housing 20 and is in the position P3. Thus, it will be appreciated that the shaft 36 of the valve shaft assembly 16 is slideably disposed along the longitudinal axis X so as to allow for positioning of the first and second ends 48 and 56 of the shaft 36 with respect to the valve housing 20.

The gasket assembly 24 is then coupled with the valve shaft assembly 16 and the valve housing 20. When the gasket assembly 24 is in the installed positioned illustrated in FIGS. 2 and 3, the shaft assembly 16 is positioned substantially between the gasket assembly 24 and the valve housing 20. It will be appreciated that the gasket assembly 24 is preferably positioned as illustrated in FIGS. 2 and 3 after the valve shaft assembly 16 is inserted and positioned in the valve housing 20.

The bearing 28 is then positioned in the opened end 70 of the valve housing 20, and preferably positioned around the end portion 52 of the first end 48 of the shaft 36. In a preferred embodiment, the bearing 28 is positioned over the shaft 36 and into the second outer portion 80 of the valve housing 20 with a press fit to ensure sealing to atmosphere. It will be appreciated that the bearing 28 preferably has a generally round cross-sectional shape opening in it, the shaft 36 likewise having a generally round cross-sectional shape. It will further be appreciated that the cross-sectional shape of the opening of the bearing 28 preferably has approximately the same cross-sectional shape as the shaft 36. Likewise, the lever 32 preferably has a generally round cross-sectional shape opening in it. It will further be appreciated that the cross-sectional shape of the opening of the lever 32 preferably has approximately the same cross-sectional shape as the shaft 36. The shaft 36 and the lever 32 are joined by a screw (not shown) in the end of the shaft, by peening the shaft, by welding or by any other suitable method. The lever 32 is positioned adjacent to the bearing 28 and the shaft 36. It should be noted that the bearing 28 and the lever 32 may be positioned before, after, or simultaneously as the gasket assembly 24 is positioned.

Unless otherwise noted, the components of the valve system 12 are preferably made of a plastic material or the like. Non limiting examples of a suitable plastic material is nylon 66 (polyhexamethylene adipamide) or nylon 6 (polycaproamide). Other multipurpose plastics may also be employed. Of course, any suitable material, including metallic compounds, may be used to produce the components of the valve system 12 according to conventional techniques in the art.

In accordance with the provisions of the patent statutes, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. An intake manifold valve system adapted for use with an internal combustion vehicle engine comprising:

a valve housing defining an axis and including a first end and an opposite second end, said first end provided with an opening formed therein, said opening defining a first axial length;

a valve shaft assembly disposed in said valve housing, said valve shaft assembly including a shaft having at least one valve provided thereon, said shaft including a first end and an opposite second end, said second end provided with an extended portion, said extended portion defining a second axial length which is greater than said first axial length of said opening whereby when said extended portion of said shaft is positioned in said opening, said extended portion is movable axially within said opening and at the same time is operative to operatively support said shaft relative to said valve housing; and a gasket assembly positioned with respect to said valve housing to selectively limit movement of said valve shaft assembly, wherein said gasket assembly includes a lug, wherein said lug is spaced apart from said shaft to selectively limit movement of said shaft of said valve shaft assembly, and wherein said lug of said gasket assembly defines a slot positioned approximately in a center portion of said lug;

wherein said valve housing includes a generally flat surface and said generally flat surface supports said gasket assembly.

2. The valve system of claim 1 wherein said valve shaft assembly further includes a vibration dampener which functions to support said shaft.

3. The valve system of claim 2 wherein said valve shaft assembly further includes at least two valves and said vibration dampener is positioned to separate said at least two valves.

4. The valve system of claim 2 wherein said valve housing further includes a separator notch and said separator notch supports said vibration dampener.

5. A method of assembly of an intake manifold valve system adapted for use with an internal combustion engine comprising the steps of:

(a) providing a valve housing having a first end and a second end, the first end provided with an opening and the second end provided with a recess, the valve housing including at least two passageways;

(b) providing a gasket assembly;

(c) providing a valve shaft assembly having a shaft and at least two valves, the shaft having a first end and an opposite second end, the first end provided with a first extended end portion and the second end provided with a second extended end portion;

(d) positioning the first extended end portion of the shaft adjacent the opening of the valve housing;

(e) subsequent to step (d), advancing the first extended end portion of the shaft in a first direction whereby the first extended end portion extends into the opening;

(f) subsequent to step (e), advancing the first extended portion of the shaft in a second opposite direction whereby at least a portion of the first extended end is disposed in the opening;

(g) subsequent to or simultaneously with step (f), moving the second extended end of the shaft relative to the valve housing so that the second end portion is disposed in the recess thereof; and (h) subsequent to step (g), securing the gasket assembly to valve housing.

6. The method of claim 5 wherein the second extended end portion of the valve shaft assembly is positioned on the recess at the second end of the valve housing.

7. The method of claim 5 further comprising a carrier gasket wherein the valve housing includes a recess at the second end of the valve housing and a bearing is positioned in the recess of the valve housing.

8. An intake manifold valve system adapted for use with an internal combustion vehicle engine comprising:

a valve shaft assembly having a shaft having a first end and a second end, the valve shaft assembly further having one or more valves and one or more vibration dampeners, the vibration dampeners supporting said shaft and positioned to separate the valves, the first end of the shaft having a first extended end portion which extends a first axial distance at the first end of the shaft and a second extended end portion which extends a second axial distance at the second end of the shaft, the first axial distance being greater than the second axial distance;

a valve housing having an upper surface and including passageways positioned to cooperate with the valves of the valve shaft assembly, the valve housing further having a first opened end and a second closed end opposite the first opened end, the first opened end having an annular hollow collar and a stepped body, the body having a first inner portion that defines a first inner diameter and a second outer portion that defines a second inner diameter, the second inner diameter being greater than the first inner diameter, the second closed end including a recess, the recess being positioned to support the second extended end portion of the shaft; and a gasket assembly having a plurality of lugs and a generally oval-shaped seal, the seal being supported by the upper surface of the valve housing, the gasket assembly further including a leg and a lower surface, the leg extending from the lower surface of the gasket assembly, the leg being adapted to secure the gasket assembly to the valve housing.

9. The valve system of claim 8 further comprising a bearing disposed in the second outer portion of the valve housing.

10. An intake manifold valve system adapted for use with an internal combustion vehicle engine comprising:

a valve housing defining an axis and including a first end and an opposite second end, said first end provided with an opening formed therein, said opening defining a first axial length;

a valve shaft assembly disposed in said valve housing, said valve shaft assembly including a shaft having at least one valve provided thereon, said shaft including a first end and an opposite second end, said second end provided with an extended portion, said extended portion defining a second axial length which is greater than said first axial length of said opening whereby when said extended portion of said shaft is positioned in said opening, said extended portion is movable axially within said opening and at the same time is operative to operatively support said shaft relative to said valve housing; and a gasket assembly positioned with respect to the valve housing to selectively limit movement of the valve shaft assembly, wherein said gasket assembly includes a foot extending from said gasket assembly, said foot being positioned to secure said gasket assembly to said valve housing;

wherein said valve housing includes a generally flat surface and said generally flat surface supports said gasket assembly.

11. The valve system of claim 10 wherein said valve shaft assembly further includes a vibration dampener which functions to support said shaft.

12. The valve system of claim 11 wherein said valve shaft assembly further includes at least two valves and said vibration dampener is positioned to separate said at least two valves.

13. The valve system of claim 11 wherein said valve housing further includes a separator notch and said separator notch supports said vibration dampener.

14. The valve system of claim 10 wherein the gasket assembly includes a lug, wherein the lug is spaced apart from the shaft to selectively limit movement of the shaft of the valve shaft assembly.

* * * * *